United States Patent [19]

Thomas

[11] 4,297,163

[45] Oct. 27, 1981

[54] DRYING OF POTASSIUM SILICATE

[75] Inventor: Jeffrey R. Thomas, Aston, Pa.

[73] Assignee: PQ Corporation, Valley Forge, Pa.

[21] Appl. No.: 110,276

[22] Filed: Jan. 7, 1980

[51] Int. Cl.³ .............................................. B01D 1/18
[52] U.S. Cl. .......................... 159/48 R; 159/DIG. 20;
 252/383; 423/332
[58] Field of Search ..................... 159/DIG. 20, 48 R;
 252/383, 385, 384; 423/332–334

[56] References Cited

U.S. PATENT DOCUMENTS 3,868,227 2/1975 Gericke et al. ...................... 423/332
3,984,526 10/1976 Haase et al. ......................... 423/332
4,011,302 3/1977 Defrawi .............................. 423/332

Primary Examiner—Norman Yudkoff
Attorney, Agent, or Firm—Ernest G. Posner; J. S. Steven Bobb; Fred C. Philpitt

[57] ABSTRACT

Potassium silicate solutions combined with silanes that contain a hydrophilic functionality can be spray dried effectively to provide free-flowing powdered products.

2 Claims, No Drawings

DRYING OF POTASSIUM SILICATE

BACKGROUND OF THE INVENTION

This invention relates to an improvement in the preparation of readily soluble potassium silicate powders by spray drying. This improvement is realized when hydrophilic silanes are combined with the silicate solution to be spray dried.

The spray drying of sodium silicate solutions to provide free-flowing readily soluble powders is well known. U.S. Pat. Nos. 1,198,203 and 1,517,891 among others describe various equipment and methods involved in spray drying sodium silicate solutions. Various commercial products appear to be prepared by these or similar methods. Spray dried potassium silicate powders do not appear to be well known and patents directed to processes for preparing such products have not been found. U.S. Pat. No. 3,918,921 includes potassium silicate solutions among the solutions that may be spray dried in a special manner to provide agglomerated products. The examples of this patent do not show the processing of potassium silicate solutions; the use of a mixed sodium-potassium silicate solution is illustrated.

It appears that partially dried potassium silicate solids are distinctly more adherent than corresponding sodium silicate materials. This property prevents efficient production of potassium silicate powders on equipment generally used for spray drying sodium silicate powders. The spray tower becomes so coated with tacky solids that production of potassium silicate is impossible.

It is an object of this invention to provide a process improvement that allows efficient production of potassium silicate powders by spray drying the corrosponding solutions.

SUMMARY OF THE INVENTION

I have found that potassium silicate powders can be efficiently prepared by combining a hydrophilic silane with the silicate solutions prior to spray drying. A surprisingly small amount of the silane effectively mitigates the adherent nature of the partially dried solids so that dryer surfaces do not become coated with the material and production can be maintained.

THE INVENTION

Any potassium silicate solution of the proper solids content and viscosity appears to be useful in the process of my invention. Such solutions contain 2.5 to 4.0 moles of $SiO_2$ per mole of $K_2O$ and $SiO_2$.

The silanes used in the process of my invention are organosilicon compounds that have organic groups of at least 2 different rective potentials attached to the silicon atom. One group is attached to the silicon in a stable manner and provides the continuing functional character of the silane. The other groups can hydrolyze thereby providing active silanol sites. The silane required for the process of my invention has a hydrophilic functionality. Examples of groups that provide hydrophilic character include among others acrylates, epoxies, amine and carboxylates. The hydrophilic silane (0.05 to 2.5 pbw per 100 pbw of silicate solids in the solution) is added to and uniformly dispersed in the silicate solution. The treated solution is then processed in the spray dryer.

The type and size of the spray dryer is not of great importance except that the dryer should be large enough and have a path of sufficient length to dry the silicate without subjecting it to extremely high temperatures. Such high temperatures cause overdried products that are difficult to dissolve and have low density. The inlet temperature can be about 120° to 350° C. while the outlet temperature can be about 70 to 175° C. The gas flow in the dryer can be co-current or counter-current with the flow of the particles. The gas can also be mixed. I prefer to use a counter-current gas flow.

The potassium silicate solutions with the added silane are atomized into the dryer. The solutions may be heated and/or diluted to reduce the relatively high viscosities that prevail at room temperature and/or high concentrations. At the proper conditions the solutions can be readily pumped and atomized. It is important that the atomization be uniform in both the size of the droplets formed and the distribution of the droplets in the drying tower. Such uniform conditions lead to products of uniform products properties especially particle size and moisture content both of which greatly influence the desirable free-flowing character of the product powder. Any convenient collection system can be used to recover the product.

The product is a free-flowing powder that contains 12.5 to 22.5% water and dissolves rapidly. The presence of the silane does not appear to influence the product properties. The product can be used for any known application for silicate wherein the physical form of a powder is an advantage.

EXAMPLES

The following examples illustrate certain embodiments of the process of my invention. It is not intended that these examples establish the scope of the invention which is defined in the disclosure and the claims. All properties are in part-by-weight (pbw) or percent-by-weight (%) unless otherwise specified.

EXAMPLE 1

This example illustrates spray drying a potassium silicate solution without addition of the silane. A potassium silicate solution containing 2.5 moles of $SiO_2$ per mole of $K_2O$ and 38.99% solids was spray dried at an inlet temperature of 279° C. an outlet temperature of 115° C. Some product that had a moisture content of 17.4% was obtained but the drying performance was so poor that no feed rate or product recovery rate could be established. The dryer walls were badly caked with partially dried potassium silicate solids that were difficult to remove.

A second run with slightly lower inlet and outlet temperatures was attempted. Some product with 15.7% moisture was obtained but caking was prevalent and a sustained product run could not be carried out.

EXAMPLE 2

The potassium silicate solution (100 bw) described in Example 1 was combined with 0.2 pbw of gamma-glycidoxypropyltrimethoxysilane and mixed thoroughly. Conditions used to spray dry this material were varied until the desired moisture level of approximately 15 to 17% was achieved. Relatively little caking occured and a sustained product run was possible. The drying conditions included an inlet temperature of 200° C. and an outlet temperature of 115° C. The feed rate was 148 lbs/hr. The product recovery rate was 10.4 lb/hr. The production of product was probably much higher than this recovery rate. Product was lost though various mechanical defects that were unrelated to the drying operation. The product was a free-flowing white powder with moisture content of 16.6%.

EXAMPLE 3

The potassium silicate solution (100 pbw) described in Example 1 was combined 0.7 pbw of beta-3,4 cyclohexylethyltrimethoxysilane and mixed thoroughly. The mixture was spray dried at the conditions described in Example 2. The product recovery rate was 12.4 lbs/hr. The product was a free-flowing white powder with a mositure content of 17.3%.

I claim:

1. In the process of spray drying potassium silicate solution to obtain powders, comprising the steps of atomizing said potassium silicate solution in a spray drying tower and subjecting the resulting droplets to elevated temperatures in said spray tower thereby removing water from the droplets and drying them: the improvement consisting of dispersing a hydrophilic silane in said potassium silicate before atomizing the solution, wherein 0.05 to 2.5 parts by weight of the hydrophilic silane are added for each 100 parts by weight of potassium silicate solids contained in said potassium silicate solution.

2. The process of claim 1 wherein the hydrophilic silane is selected from that group of silanes which contain acrylate, epoxy, amine or carboxylate groups.

* * * * *